(12) United States Patent
Arai

(10) Patent No.: US 7,275,080 B2
(45) Date of Patent: Sep. 25, 2007

(54) TROUBLE INFORMATION MANAGEMENT SYSTEM

(75) Inventor: Mineo Arai, Bunkyo (JP)

(73) Assignee: Fujitsu Limited, Kawasaki (JP)

( * ) Notice: Subject to any disclaimer, the term of this patent is extended or adjusted under 35 U.S.C. 154(b) by 816 days.

(21) Appl. No.: 10/058,421

(22) Filed: Jan. 30, 2002

(65) Prior Publication Data

US 2002/0107919 A1    Aug. 8, 2002

(30) Foreign Application Priority Data

Feb. 2, 2001    (JP) .............................. 2001-027226

(51) Int. Cl.
    G06F 15/16    (2006.01)
(52) U.S. Cl. .................... 709/203; 709/223; 709/224; 709/225; 707/2; 707/3; 714/2; 714/4; 714/25
(58) Field of Classification Search ................ 709/203, 709/223–225; 707/2–3
    See application file for complete search history.

(56) References Cited

U.S. PATENT DOCUMENTS 5,287,505 A * 2/1994 Calvert et al. ................ 707/10
6,014,658 A * 1/2000 Pretz .............................. 707/2
6,286,084 B1* 9/2001 Wexler et al. ............... 711/152
6,321,348 B1* 11/2001 Kobata ......................... 714/37
6,490,602 B1* 12/2002 Kraemer ..................... 715/513
6,553,507 B1* 4/2003 Cohen ........................... 714/4

* cited by examiner

Primary Examiner—Bunjob Jaroenchonwanit
Assistant Examiner—Duyen Doan
(74) Attorney, Agent, or Firm—Staas & Halsey LLP

(57) ABSTRACT

A trouble information management system 1 is connected to maker-sided devices 2 of makers and connectable to terminal devices 3 of users. The user, if a trouble occurs when using H/W and S/W provided by the maker, notifies the trouble information management system 1 of this trouble. The trouble information management system 1 searches for a record of case data T registered with a trouble case and, if the notified trouble is already registered in the case data T, notifies the user of a troubleshooting procedure on the basis of the case data T. If the notified trouble is a new case, the trouble information management system 1 requests the maker to research it, generates the case data T based on an answer to this request, and notifies the user of the troubleshooting procedure.

12 Claims, 12 Drawing Sheets

FIG.7

| | | |
|---|---|---|
| WARE-CATEGORY | ☐ HADWARE | ■ SOFTWRE |
| TROUBLE COMPONENT | : | WORD PROCESSOR-C |
| NAME OF TROUBLE CASE | : | ... |
| TROUBLE CONTENT | : | ......... |
| | | |
| USING OS | : | OS-B |
| USING PC | : | PC-A |
| USING COMPONENT 1 | : | WORD PROCESSOR-C |
| USING COMPONENT 2 | : | SPREADSHEET-D |
| USING COMPONENT 3 | : | |
| USING COMPONENT 4 | : | |

TRANSMIT    CANCEL

FIG.8

| | | |
|---|---|---|
| WARE-CATEGORY | ☐ HADWARE | ■ SOFTWRE |

TROUBLE COMPONENT : WORD PROCESSOR-C
NAME OF TROUBLE CASE : ...
TROUBLE CONTENT : .........

USING OS : OS-B
USING PC : PC-A
USING COMPONENT 1 : WORD PROCESSOR-C
USING COMPONENT 2 : SPREADSHEET-D
USING COMPONENT 3 :
USING COMPONENT 4 :
 .
 .
CAUSE : .........

TROUBLESHOOTING PROCEDURE : .........
[ TROUBLESHOT ] [ NON-TROUBLESHOT ]

FIG.10

| CASE NUMBER | RELATED COMPONENT | TROUBLE COMPONENT | USING OS | USING PC | NAME OF TROUBLE CASE | TROUBLE CONTENT |
|---|---|---|---|---|---|---|
| 1000 | WORD PROCESSOR-C | WORD PROCESSOR-C | OS-B | PC-A | ○○○ | ○○○ |
| 1000 | SPREADSHEET-D | WORD PROCESSOR-C | OS-B | PC-A | ○○○ | ○○○ |
| 1000 | UTILITY-E | WORD PROCESSOR-C | OS-B | PC-A | ○○○ | ○○○ |
| 1000 | MAIL SOFTWARE-F | WORD PROCESSOR-C | OS-B | PC-A | ○○○ | ○○○ |
| 1001 | WORD PROCESSOR-C | WORD PROCESSOR-C | OS-B | PC-A | △△△ | △△△ |
| 1001 | TOOL-H | WORD PROCESSOR-C | OS-B | PC-A | △△△ | △△△ |
| 1002 | WORD PROCESSOR-C | WORD PROCESSOR-C | OS-B | PC-A | ×× × | ×× × |
| 1002 | SPREADSHEET-D | WORD PROCESSOR-C | OS-B | PC-A | ×× × | ×× × |
| 1002 | CAD-G | WORD PROCESSOR-C | OS-B | PC-A | ×× × | ×× × |
| 1003 | WORD PROCESSOR-C | WORD PROCESSOR-C | | | | |

FIG.11

| CASE NUMBER | RELATED COMPONENT | TROUBLE COMPONENT | USING OS | USING PC | NAME OF TROUBLE CASE | TROUBLE CONTENT |
|---|---|---|---|---|---|---|
| 1000 | WORD PROCESSOR-C | WORD PROCESSOR-C | OS-B | PC-A | ○○○ | ○○○ |
| 1000 | SPREADSHEET-D | WORD PROCESSOR-C | OS-B | PC-A | ○○○ | ○○○ |
| 1000 | UTILITY-E | WORD PROCESSOR-C | OS-B | PC-A | ○○○ | ○○○ |
| 1000 | MAIL SOFTWARE-F | WORD PROCESSOR-C | OS-B | PC-A | ○○○ | ○○○ |
| 1001 | WORD PROCESSOR-C | WORD PROCESSOR-C | OS-B | PC-A | △△△ | △△△ |
| 1001 | TOOL-H | WORD PROCESSOR-C | OS-B | PC-A | △△△ | △△△ |
| 1002 | WORD PROCESSOR-C | WORD PROCESSOR-C | OS-B | PC-A | ×× | ××× |
| 1002 | SPREADSHEET-D | WORD PROCESSOR-C | OS-B | PC-A | ××× | ××× |
| 1002 | CAD-G | WORD PROCESSOR-C | OS-B | PC-A | ××× | ××× |

FIG.12

| CASE NUMBER | RELATED COMPONENT | TROUBLE COMPONENT | USING OS | USING PC | NAME OF TROUBLE CASE | TROUBLE CONTENT |
|---|---|---|---|---|---|---|
| 1000 | WORD PROCESSOR-C | WORD PROCESSOR-C | OS-B | PC-A | ○○○ | ○○○ |
| 1000 | SPREADSHEET-D | WORD PROCESSOR-C | OS-B | PC-A | ○○○ | ○○○ |
| 1000 | UTILITY-E | WORD PROCESSOR-C | OS-B | PC-A | ○○○ | ○○○ |
| 1000 | MAIL SOFTWARE-F | WORD PROCESSOR-C | OS-B | PC-A | ○○○ | ○○○ |
| 1002 | WORD PROCESSOR-C | WORD PROCESSOR-C | OS-B | PC-A | ×○× | ××× |
| 1002 | SPREADSHEET-D | WORD PROCESSOR-C | OS-B | PC-A | ××× | ××× |
| 1002 | CAD-G | WORD PROCESSOR-C | OS-B | PC-A | ××× | ××× |

FIG.13

TROUBLE COMPONENT : | WORD PROCESSOR-C |
NAME OF TROUBLE CASE : | ⋯ |

| 1 | USING COMPONENT 1 | : | WORD PROCESSOR-C |
| | USING COMPONENT 2 | : | SPREADSHEET-D |
| | USING COMPONENT 3 | : | UTILITY-E |
| | USING COMPONENT 4 | : | MAIL SOFTRWRE-F |
| 2 | USING COMPONENT 1 | : | WORD PROCESSOR-C |
| | USING COMPONENT 2 | : | SPREADSHEET-D |
| | USING COMPONENT 3 | : | CAD-G |

CANCEL

TROUBLE INFORMATION MANAGEMENT SYSTEM

BACKGROUND OF THE INVENTION

1. Field of the Invention

The present invention relates to a trouble information management method of troubleshooting a trouble which a user notifies of. The present disclosure relates to subject matter contained in Japanese Patent application No. 2001-27226 (filed on Feb. 2, 2001), which is expressly incorporated herein by reference in its entirety.

2. Description of the Related Art

A user using a computer system constructed of software components and hardware components, if a trouble occurs during its operation, requests directly each of makers of the hardware and software components configuring the computer system to examine a cause of the trouble.

Note that the individual software and hardware components are not necessarily provided by a single maker. Particularly under a so-called multi-vendor environment, the components configuring the computer system are provided respectively by a plurality of makers.

Accordingly, if the trouble occurs, the user must specify the makers of the plurality of components considered to be related to the trouble and request individually all the specified makers to examine the trouble.

It is, however, a large burden for the user to individually inform each maker. Besides, it is time-consuming to troubleshoot the trouble.

SUMMARY OF THE INVENTION

It is a primary object of the present invention to provide a trouble information management method able to inform a user of a troubleshooting procedure when a user notifies of an occurrence of a trouble that components of a plurality of makers might get involved in.

To accomplish the above object, according to one aspect of the present invention, there is provided a trouble information management program for making a server computer connected to a maker-sided devices of a plurality of makers for providing software or hardware components configuring a computer system, and connectable to terminal devices of users utilizing the components, execute at least a first step of storing case data containing a description of a trouble and a troubleshooting algorithm, and a second step of obtaining, when the server computer receives from the user terminal device a notification that the trouble occurs, trouble data containing the description of the trouble from the terminal device, searching for a record of the case data in which the description of this trouble is coincident with the description of trouble in the trouble data among records of the case data, then transmitting, if the record of the case data is specified by the search, a troubleshooting algorithm in the specified record of the case data to the terminal device, subsequently transmitting, if any record of the case data is not specified by the search, new notification data containing the description of the trouble and indicating that the trouble is a trouble occurred afresh to the maker-sided device, then obtaining answer data containing a troubleshooting algorithm corresponding to the new notification data from the maker-sided device, storing the troubleshooting algorithm contained in the obtained answer data and the description about the corresponding trouble as a new record of the case data, and transmitting the troubleshooting algorithm in the case data to the terminal device.

With this architecture, if the trouble data transmitted from the terminal device of the user corresponds to any of the existing cases accumulated as the case data, the user obtains the troubleshooting algorithm in the case data, whereby the trouble can be immediately troubleshot. Whereas if any record of the case data corresponding to the trouble data is not accumulated, the trouble information management system (the server computer) transmits the new notification data to the maker-sided device, and obtains the answer data to the new notification data. the new case data are generated based on the answer data, and the user obtains the troubleshooting algorithm in the generated case data, whereby the trouble can be troubleshot.

Note that the new notification data may be transmitted to only the makers of the components presumed to be related to the trouble. Further, a provider administering the trouble information management system may request each of the makers providing the components related to the trouble for a consideration for the new notification data, and may pay the user an amount of money obtained by subtracting a commission from this consideration as an information providing fee. Moreover, the trouble information management system may extract a record of the case data related to the component provided by the maker, and generate maker-oriented data provided to the maker on the basis of the extracted record of the case data for every maker.

BRIEF DESCRIPTION OF THE DRAWINGS

The invention will be described below in detail with reference to the accompanying drawings, in which:

FIG. 7 is a schematic diagram showing an input Web page;

FIG. 8 is a schematic diagram showing a result display Web page;

FIG. 10 is a schematic diagram showing the case data selected;

FIG. 11 is a schematic diagram showing the case data extracted;

FIG. 12 is a schematic diagram showing the case data narrowed down;

FIG. 13 is a schematic diagram showing a specifying Web page; and

DESCRIPTION OF THE PREFERRED EMBODIMENT

A trouble information management system 1 in one embodiment of the present invention will hereinafter be described with reference to the accompanying drawings.

Whole Architecture

Figure 1:
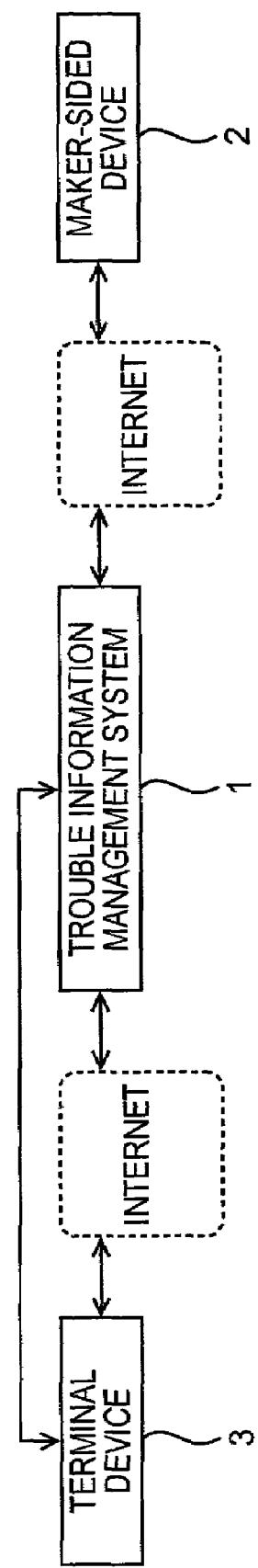
FIG. 1 is a diagram showing a whole system including a trouble information management system in one embodiment of the present invention.

As shown in FIG. 1, this trouble information management system 1 is connected via the Internet to maker-sided devices 2. Each of the maker-sided devices 2 is operated by each of makers that provide software components and hardware components constituting a computer system. Note that FIG. 1 illustrates one single maker-sided device 2, however, as a matter of fact, a plurality of maker-sided devices 2 are connected to the trouble information management system 1.

This trouble information management system 1 is operated by an Internet service provider. Then, a user establishing a contract with the provider connects a user's own terminal device 3 directly to the trouble information management system 1 via a public line etc or via the Internet, and is thus able to utilize services provided by the provider. One single terminal device 3 is depicted in FIG. 1, however, a plurality of terminal devices 3 are actually connectable to the trouble information management system 1.

Each of these terminal devices 3 and maker-sided devices 4 is constructed of a normal personal computer or a workstation or others. Then, each of these terminal devices 3 and maker-sided devices 4 includes a CPU, a monitor, a keyboard, a mouse and a storage unit stored with a WWW (World Wide Web) Browser program and a mail client program.

Note that the user, if there occurs a trouble of a hardware or software component of the terminal device 3 or other computer system during its use, notifies the trouble information management system 1 that the trouble occurred. Then, the trouble information management system 1 obtains a trouble shooting procedure corresponding to the trouble by executing a troubleshooting process (FIG. 6) that will be explained later on, and notifies the user of the troubleshooting procedure.

Trouble Information Management System

Figure 2:
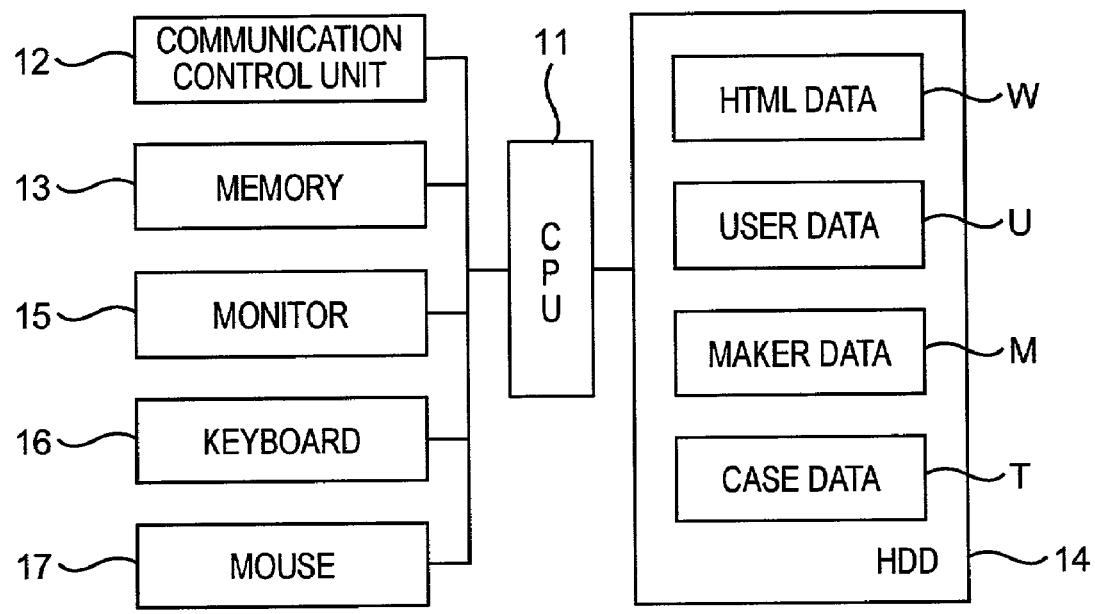
FIG. 2 is a diagram showing an architecture of the trouble information management system in one embodiment of the present invention.

The trouble information management system 1 is a highly functional computer utilized as a server machine (server computer). FIG. 2 is a diagram showing an architecture of this trouble information management system 1. The trouble information management system 1 includes a CPU 11, a communication control unit 12, a memory 13, a had disk (HDD) 14, a monitor 15, a keyboard 16 and a mouse 17, these components 12 through 17 being respectively connected to the CPU 11. The communication control unit 12 is connected via the Internet to each of the maker-sided devices 2. Further, the terminal device 3 is connectable to the communication control unit 12 via the public line or the Internet.

The HDD 14 is stored with an operating system (OS) and an application program. The OS has a kernel for the system management, and provides the application program with API (Application Program Interface). Then, the CPU 11 operates based on codes of the OS in a state where at least a part of the OS are developed on the memory 13.

On the other hand, the application program is a program for actualizing a predetermined process by invoking the function of the OS through API. This application program includes a WWW server program and a mail server program.

Moreover, the HDD 14 is stored with HTML (HyperText Markup Language) data W utilized by the WWW server program. The HTML data W contains programs described in various categories of script languages. Further, the HDD 14 is stored with unillustrated Applet (a program embedded in HTML pages) used together with the HTML data W. In addition, the HDD 14 is stored with unillustrated programs such as CGI (Common Gateway Interface) etc utilized by the WWW server program.

Then, the WWW server program of this trouble information management system 1 is executed in linkage with the WWW Browser program executed by the terminal device 3, thereby displaying a Web page based on the HTML data W on the monitor of the terminal device 3.

Further, as shown in FIG. 2, the HDD 14 of the trouble information management system 1 is stored with pieces of user data U about the users and pieces of maker data M about the makers.

Figure 3:
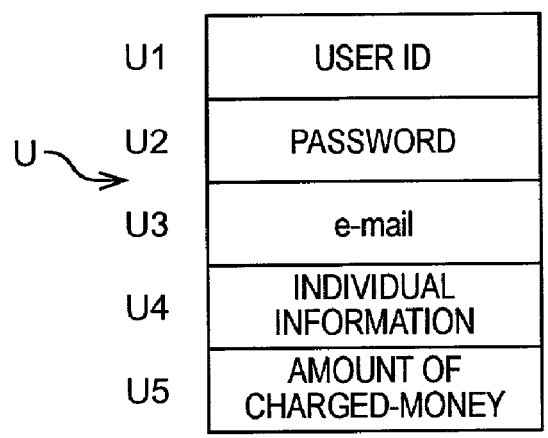
FIG. 3 is a schematic diagram showing a structure of user data.

FIG. 3 is a schematic diagram showing a structure of the user data U. Note that the provider, when the user newly makes a contract, issues a unique-to-user ID to this user. Then, a record of user data U is provided corresponding to every user ID.

As shown in FIG. 3, each record of the user data U consists of a user ID entered in a user ID field U1, a password corresponding to the user ID that is entered in a password field U2, a user's e-mail address entered in a e-mail address field U3, data entered in an individual information field U4, and data entered in a charged-money field U5.

Note that when the user sends the user ID and the password to the trouble information management system 1 by operating the terminal device 3, the trouble information management system 1 receives the user ID and the password, and authenticates the identity of the user. Namely, the trouble information management system 1 specifies the user data U containing the received user ID entered in the user ID field U1, and, only when the password entered in the password field U2 of the specified user data U is coincident with the received password, permits the user's terminal device 3 to be connected to the system 1, thus providing a variety of services.

Moreover, the trouble information management system 1 is capable of delivering e-mail to the user on the basis of the e-mail address stored in the e-mail address field U3 of the user data U. The individual information field U4 is stored with pieces of individual information such as a name, an address, a telephone number, a bank account number, etc of the user. The charged-money field U5 is stored with a service providing fee charged upon the user by the provider.

Figure 4:
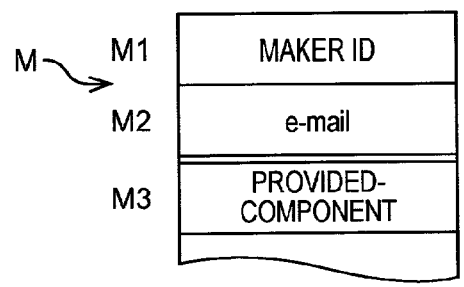
FIG. 4 is a schematic diagram showing a structure of maker data.

FIG. 4 is a schematic diagram showing a structure of the maker data M. Note that each maker is given a maker ID uniquely mapped to this maker. Then, each record of the maker data M is provided corresponding to every maker ID.

As shown in FIG. 4, each record of the maker data M consists of a maker ID entered in a maker ID field, a maker's e-mail address entered in an e-mail address field M2, and names of (software or hardware) components provided by this maker that are entered in a plurality of provided-component fields M3.

Further, as shown in FIG. 2, the HDD 14 of the trouble information management system 1 is stored with case data T about a case where a trouble occurred during the use of the user's computer. The case data T are generated by detailed processes (FIG. 14), which will be explained later, on the basis of a trouble notification from the user, and are accumulated within the HDD 14.

Figure 5:
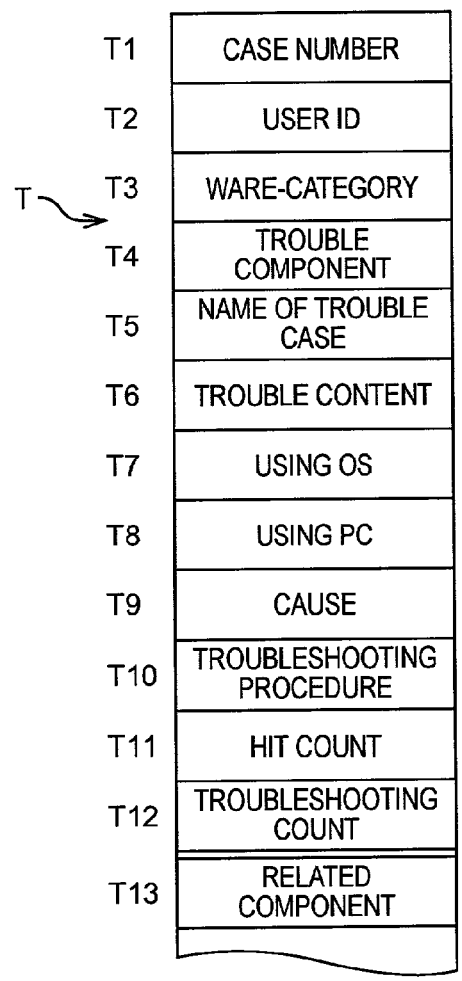
FIG. 5 is a schematic diagram showing a structure of case data.

FIG. 5 is a schematic diagram showing a structure of the case data T. As shown in FIG. 5, a table of the case data T contains a case number field T1 stored with case numbers given to the cases in the sequence of the data generation, and a user ID field T2 stored with the user IDs of the users who notified of the troubles.

Further, the case data T table contains a ware-category field T3 stored with binary data indicating which category, hardware or software, the trouble comes under, a trouble component field T4 stored with a name of the component conceived as a direct cause of the trouble, a trouble case name field T5, a trouble content field T6, a using OS field T7 and a using PC field T8. Note that these fields T3 through T8 are stored with information of which the user notified.

The case data T table further contains a cause field T9 and a troubleshooting procedure field T10. These two fields T9, T10 are stored with information provided from the maker and information created by the provider. Moreover, the case data T table contains a hit count field T11 and a troubleshooting count field T12. The hit count field T11 is stored with a count showing how many times the case data T is referred to for troubleshooting the trouble. The troubleshooting count field T12 is stored with a count showing how many times the case data T contributes to troubleshooting.

The case data T table still further contains a plurality of related component fields T13. Each of these related component fields T13 is stored with a name of a component having some relation with the trouble among the components used by the user when the trouble happens. Supposing that the trouble component (T4) directly causing the trouble is used in linkage with other components when the trouble occurs, it is to be noted that the above related component fields T13 are stored with the name of the trouble components and the names of other components used in linkage.

Troubleshooting Process

Figure 6:
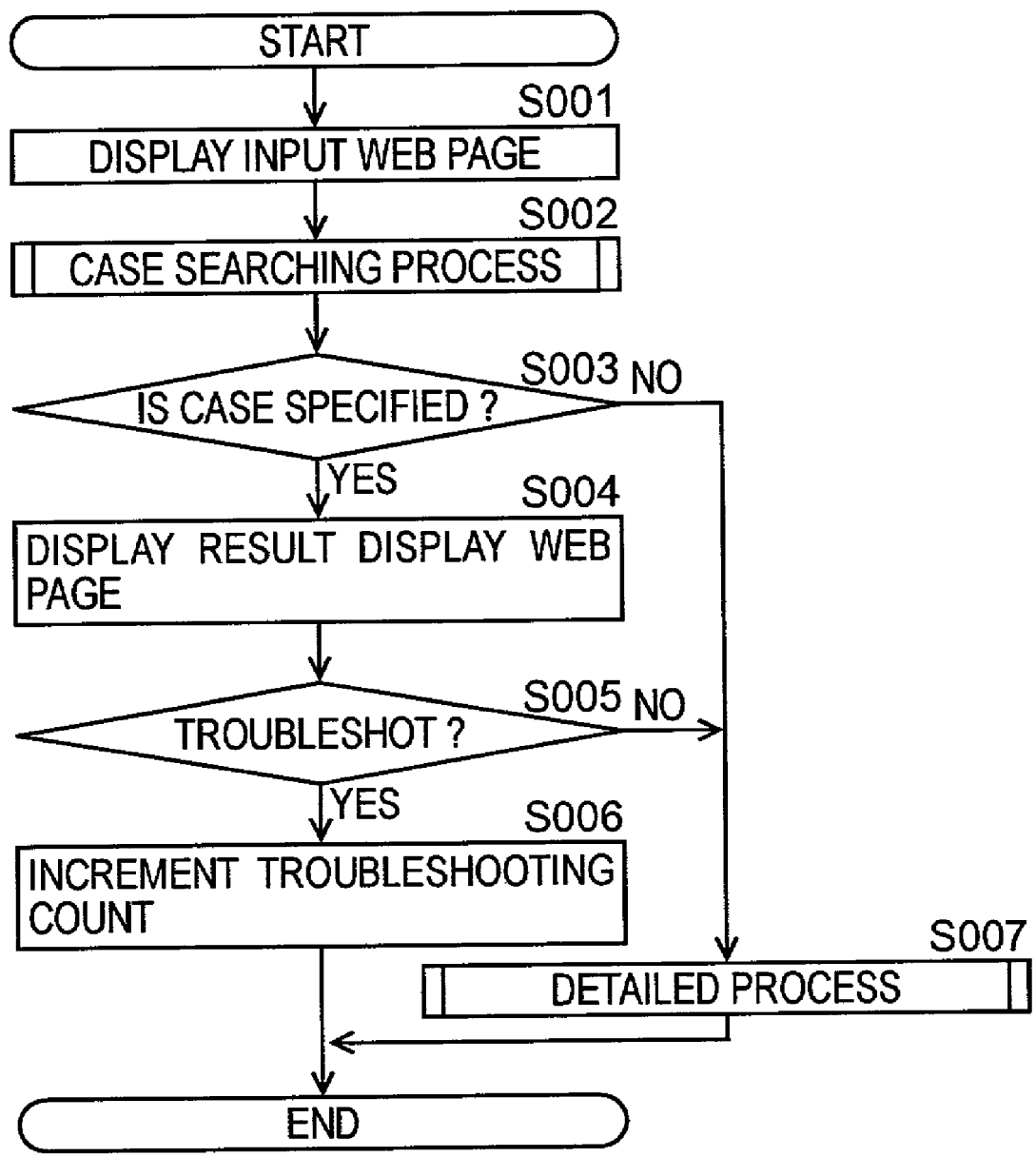
FIG. 6 is a flowchart showing a troubleshooting process.

A process in which the trouble information management system 1 troubleshoots the trouble of which the user notified, will hereinafter be explained. FIG. 6 is a flowchart showing the troubleshooting process. The troubleshooting process in FIG. 6 is triggered by such an event that the user indicates an occurrence of the trouble on the Web page provided by the trouble information management system 1 by operating the terminal device 3. Namely, the trouble information management system 1, upon receiving the indication from the user, boots the process in the flowchart shown in FIG. 6.

In first step S001, the trouble information management system 1 displays an input Web page on the monitor of the terminal device 3. FIG. 7 is a schematic diagram showing this input Web page. This input Web page contains a couple of "ware-category" checkboxes. Then, if the trouble occurred is related to a software component, the user clicks the "software" checkbox on the terminal device 3. By contrast, if the trouble occurred is related to a hardware component, the user clicks the "hardware" checkbox on the terminal device 3.

Further, the input Web page contains input boxes such as "trouble component", "name of trouble case", "content of trouble", "using OS" and "using PC". The input Web page still further contains a plurality of "using component" input boxes. Then, the user inputs pieces of data into the respective input boxes on the input Web page.

For example, it is assumed that when the user uses a "word processor-C" in an environment where "OS-B" is installed into a "personal computer-A", a trouble happens. It is also assumed that "spreadsheet-D" is used in combination when this trouble happens. In this case, the user inputs the "word processor-C" into the input box "trouble component", "OS-B" into the input box "usingOS" and "PC-A" into the input box "usingPC". Further, the user inputs the "word processor-C" into the "using component 1" and "spreadsheet-D" into the input box "using component 2".

Moreover, the user inputs a concise "title" showing a content of the trouble occurred into the input box "name of trouble case". Still further, the user inputs a sentence explaining the content of this trouble into the input box "content of trouble".

With those inputs done, the user clicks a "transmit" button displayed on the input Web page by operating the input device of the terminal device 3. Then, the trouble information management system 1 receives the information (trouble data) inputted on the input Web page, and advances the processing to S002.

In next step S002, the trouble information management system 1 executes a case searching process. Namely, the trouble information management system 1 searches for the cases related to the trouble inputted in S001 from the accumulated records of case data T. Note that the case searching process in S002 will hereinafter be described referring to FIG. 9.

In next step S003, the trouble information management system 1 diverts the processing in accordance with a result of the processing in S002. To be specific, the trouble information management system 1, if the record of the case data is specified in S002, advances the processing to S003, and, if not specified, diverts the processing to S007.

In S004, the trouble information management system 1 creates the HTML data W on the basis of the case data T specified in S002, and displays a result display Web page corresponding to the created HTML data W on the monitor of the terminal device 3. FIG. 8 is a schematic diagram showing this result display Web page. The data (contents) entered in the respective fields T4 through T8 in the case data T (FIG. 5) specified in S002 are displayed in the boxes such as the "trouble component", the "name of trouble case", the "content of trouble", the "using OS" and "using PC" on the result display Web page. Moreover, the data entered in the fields T13 in the case data T specified in S002 are displayed in the "component" boxes on the result display Web page. Further, the data entered in the cause field T9 and the troubleshooting field T10 in the case data T specified in S002 are displayed in a "cause" box and a "troubleshooting" box on the result display Web page. The result display Web page contains a "troubleshot" button and a "non-troubleshot" button.

Then, the user carries out a trouble shooting procedure based on the content displayed in the "troubleshooting procedure" on the result display Web page with respect to the computer system with the trouble occurred. After the execution, the user, when judging that the trouble has been troubleshot by the process based on the above content (the troubleshooting procedure), clicks the "troubleshot" button displayed on the result display Web page by operating the terminal device 3. While on the other hand, the user, when judging that the trouble is not yet troubleshot, clicks the "non-troubleshot" button displayed on the result display Web page. When clicking any one of these "troubleshot" and "non-troubleshot" buttons, the trouble information management system 1 advances the processing to S005.

In S005, the trouble information management system 1 diverts the processing based on which button has been clicked in S004. More specifically, the trouble information management system 1, when the "troubleshot" button shown in FIG. 8 has been clicked, advances the processing to S006, and, when "non-troubleshot" button has been clicked, diverts the processing to S007.

In S006, the trouble information management system 1 increments the troubleshooting count by adding "1" to a value entered in the trouble shooting count field T12 in the case data T specified in S002, and finishes the process.

In S007, the trouble information management system 1 executes the detailed process. Namely, the trouble information management system 1 analyzes the trouble in greater detail, and obtains a troubleshooting procedure for troubleshooting this trouble. Note that the detailed process in S007 will be explained referring to FIG. 14. Then, the trouble information management system 1, after troubleshooting the trouble in this detailed process, finishes the process.

Case Searching Process

Figure 9:
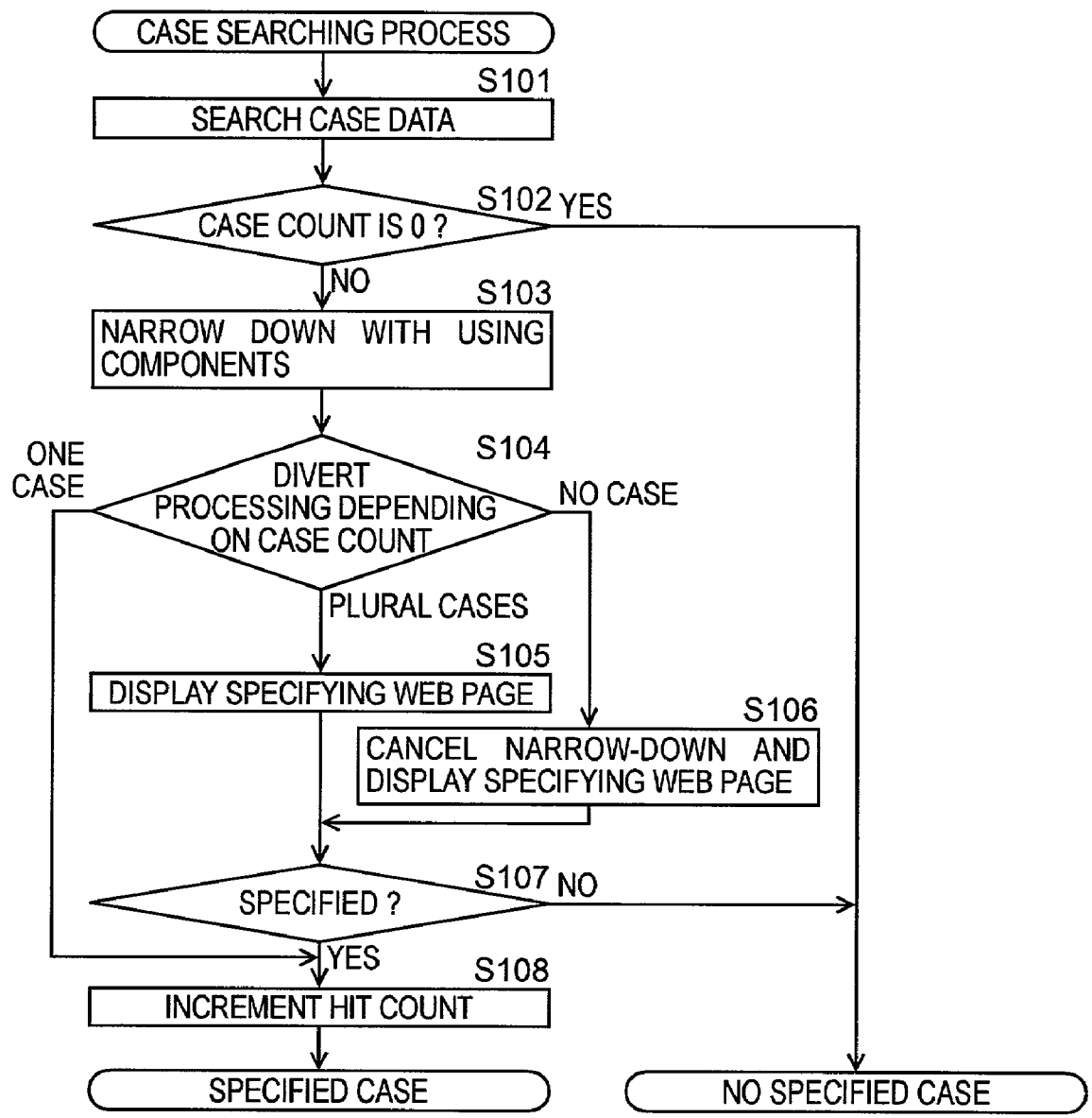
FIG. 9 is a flowchart showing a case searching process.

The case searching process (S002 in FIG. 6) will be explained with reference to a flowchart in FIG. 9.

In first step S101, the trouble information management system 1 searches the case data T on the basis of the information inputted in S001 in FIG. 6. At first, the trouble information management system 1 uses, as search keys, the information inputted into the input boxes "trouble component", "using OS" and "using PC" on the input Web page shown in FIG. 7.

Then, the trouble information management system 1 searches the case data T (FIG. 5) on the basis of the search keys. That is, the trouble information management system 1 picks up the trouble component (T4), the using OS (T7) and the using PC (T8) that are coincident with the contents of the search keys from all the records of the case data T. FIG. 10 is a schematic diagram showing the picked-up records of the case data T.

Further, the trouble information management system 1 extracts keywords from character strings inputted into the input boxes "name of trouble case" and "content of trouble" on the input Web page in FIG. 7, and uses these keywords as search keys. Then, the trouble information management system 1 extracts the records with the above keywords contained in the "name of trouble" and "content of trouble" fields from the picked-up records of the case data T (FIG. 10). FIG. 11 is a schematic diagram showing the extracted records of the case data T. FIG. 11 shows an example of the extracted records of the case data T of totally three cases with the case numbers "1000", "1001" and "1002".

In next step S102, the trouble information management system 1 diverts the processing in accordance with a result of processing in S101. To be specific, the trouble information management system 1, if the case data T of one or more cases are extracted in S101, advances the processing to S103. Whereas if not extracted, the trouble information management system 1 judges that any record of the case data T is not specified (no specified case), and finishes the process.

In S103, the trouble information management system 1 further narrows down the case data T extracted in S101 with the using components. Namely, the trouble information management system 1 narrows down the case data T (FIG. 11) extracted in S101 on condition that all the component names inputted into the input boxes "using component" on the input Web page shown in FIG. 7 are contained in the "related component" fields thereof. FIG. 12 is a schematic diagram showing the thus narrowed-down case data T. FIG. 12 shows the case data T of totally two cases given the case numbers "1000" and "1002".

In S104, the trouble information management system 1 diverts the processing in accordance a case count of the case data T narrowed down in S003. That is, the trouble information management system 1, if the case count is 1, diverts the processing to S108. The trouble information management system 1, if the case count is 2 or more, advances the processing to S105, and, if the case count is 0, diverts the processing to S106.

In S105, the trouble information management system 1 displays a specifying Web page on the monitor of the terminal device 3. FIG. 13 is a schematic diagram showing this specifying Web page. To start with, the trouble information management system 1 sorts the respective components stored in the "related component" field in each record of the case data T narrowed down in S103 as a component suite for every record of the case data T, and generates the HTML data W. Then, the trouble information management system 1 displays the specifying Web page defined as a Web page corresponding to the generated HTML data W on the monitor of the terminal device 3.

FIG. 13 shows the component suites on the specifying Web page. A component suite consisting of "word processor-C", "spreadsheet-D", "utility-E" and "mail software-F" defined as the related components of the case data T given the case number "1000" in FIG. 12, is displayed in a box "1" on this specifying Web page. On the other hand, a component suite consisting of "word processor-C", "spreadsheet-D" and "CAD-G" defined as the related components of the case data T with the case number "1002" in FIG. 12, is displayed in a box "2" on the specifying Web page.

Then, the user specifies only one component suite most approximate to the component suite employed by the user himself or herself among the component suites displayed therein. Incidentally, it is assumed that the user is, though inputting only "word processor C" and "spreadsheet-D" into the input box "using component" on the input Web page shown in FIG. 7, to actually use the utility-E in combination in addition thereto. In this case, the user specifies the component suite "1" displayed in FIG. 13. With this process in S105, the user is able to review the components that could not be inputted without being aware of them. Then, the trouble information management system 1 advances the processing to S107.

Note that if the user is unable to specify one of the component suites having substantially the same content which are displayed on the specifying Web page, the user clicks a "cancel" button displayed on the specifying screen (FIG. 13) by operating the terminal device 3. The processing proceeds to S107 also when the "cancel" button is clicked.

On the other hand, in S106, the trouble information management system 1 cancels the narrow-down process executed in S103 and thereafter displays the specifying Web page (FIG. 13) on the monitor of the terminal device 3. Note that the trouble information management system 1 generates in S105 the HTML data W for the specifying Web page on the basis of the case data T narrowed down in S103. By contrast, the trouble information management system 1 generates in S106 the HTML data W for the specifying Web page on the basis of the case data T extracted in S101. The process other than this is the same as S105. Upon a completion the process in S106, the processing proceeds to S107.

In S107, the trouble information management system 1 diverts the processing depending on whether the case data T are specified in S105 or S106. Namely, the trouble information management system 1, if the case data T are specified, advances the processing to S108, and, if not specified, after judging that there is no specified case, finishes the process.

In S108, the trouble information management system 1 increments a hit count by adding "1" to a value entered in the hit count field T11 in the case data T specified in S105 or S106, and, after judging that there is the specified case, finishes the process.

Detailed Process

Figure 14:
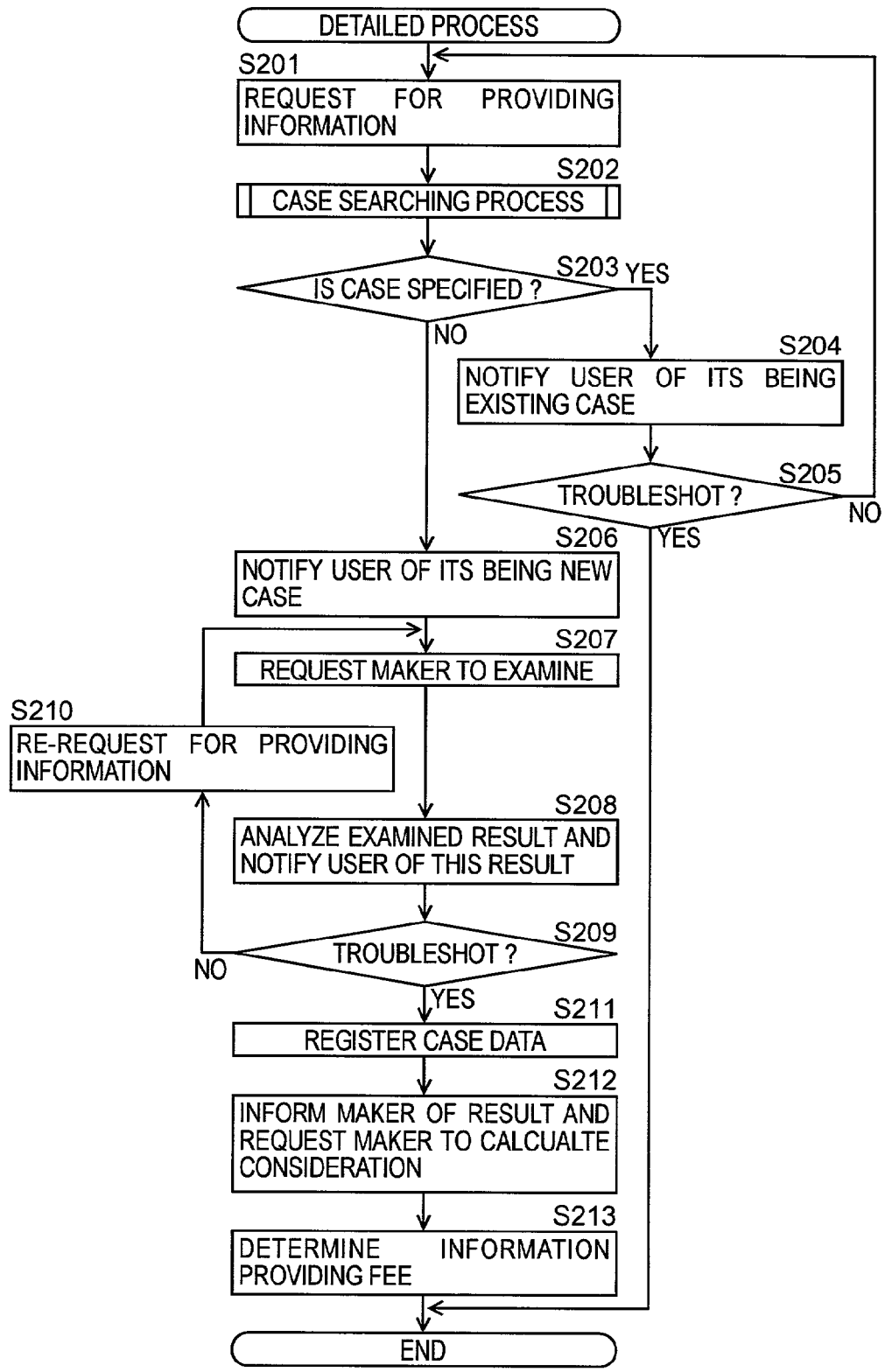
FIG. 14 is a flowchart showing a detailed process.

The detailed process (S007 in FIG. 6) will be explained with reference to a flowchart in FIG. 14.

In first step S201, the trouble information management system 1 delivers to the terminal device 3 e-mail for making a request for providing the more detailed information when the trouble occurs. Then, the user reads the e-mail by operating the terminal device 3 and transmits the detailed information by e-mail to the trouble information management system 1. The trouble information management system 1 receives the e-mail containing the detailed information.

In next step S202, the trouble information management system 1 displays the e-mail received in S201 on the monitor 15 thereof, and indicates an operator belonging to the provider to execute a case searching process. The operator, after examining the mail delivered from the user, executes the case searching process. This case searching process is the same as the case searching process in S002 in FIG. 6. In S002 shown in FIG. 6, however, the trouble information management system 1 displays the Web page on the terminal device 3, whereby the user searches for the cases. By contrast, however, in S202 shown in FIG. 14, the trouble information management system 1 displays the Web page on the monitor 15, whereby the operator searches for the cases.

In next step S203, the trouble information management system 1 diverts the processing in accordance with a result of the processing in S202. Namely, the trouble information management system 1, if the search for some records of the case data T are hit and the these records of the case data T are specified, advances the processing to S204, and, whereas if not, diverts the processing to S206.

In S204, the trouble information management system 1 notifies the user by e-mail that the trouble reported by the user is not a new case but the existing case.

More specifically, to begin with, the operator reexamines the case data T specified in S202 and confirms whether an indispensable related component (T13) is mistakenly contained in the case data T (FIG. 5). A quality of the case data T is enhanced through this confirmation.

For example, if the related components (T13) of a certain record of the case data T are three components such as the word processor-C, the spreadsheet-D and an accessory-K, a trouble occurs even when only the word processor-C and the accessory-K are operated, and it is to prove from a result of the confirmation that the spreadsheet-D is unrelated to the trouble. In this case, the operator eliminates the spreadsheet-D out of the related components (T13) in this record of the case data T and leaves the word processor-C and the accessory-K as they are by operating the trouble information management system 1.

Then, the operator transmits the confirmed case data T by e-mail to the terminal device 3 of the user. The user reads this e-mail by operating the terminal device 3, then judges whether the trouble is troubleshot or not, and sends a result of the judgement by e-mail to the trouble information management system 1.

In next step S205, the trouble information management system 1 diverts the processing in accordance with a content of the mail delivered from the user. That is, the operator reads the e-mail from the user by operating the trouble information management system 1, then finishes, if the trouble is troubleshot, the process, and loops the processing back to S201 if not troubleshot.

On the other hand, in S206, the trouble information management system 1 notifies the terminal device 3 of the user by mail that the trouble reported by the user is the new case.

In next step S207, the trouble information management system 1 requests the maker to check it. To be specific, at first, the trouble information management system 1 obtains the component names inputted by the user in S001 in FIG. 6 into the input boxes "using component" on the input Web page shown in FIG. 7. Then, the trouble information management system 1 selects the maker data M (FIG. 4) containing the obtained component names. Namely, the maker data M having the provided-component fields M3 stored with the obtained component names, is selected. Further, the operator operates the trouble information management system 1, thereby delivering e-mail (new notification data) containing the information inputted in S001 in FIG. 6 on the input Web page shown in FIG. 7 and giving an indication of being notified of a new trouble to the maker-sided device 2 of the maker corresponding to the selected maker data M.

Thereupon, a person in charge at the maker examines a cause of the trouble on the basis of items written in that e-mail. Then, the person in charge at the maker, when judging that the component provided by this maker is related to the trouble, delivers to the trouble information management system 1 e-mail (answer data) containing this cause and a troubleshooting procedure by operating the maker-sided device 2. While on the other hand, the person in charge at the maker, when judging that the component provided by this maker is not related to the trouble, delivers to the trouble information management system 1 e-mail showing this purport by operating the maker-sided device 2.

In next step S208, the trouble information management system 1 receives the mail delivered from the maker-sided device 2. Then, the operator analyzes the mail received and formulates a result of this analysis as the cause of the trouble and troubleshooting procedure. In this case, the operator categorizes the components into trouble-related components and trouble-unrelated components.

Then, the operator sends by e-mail the trouble cause and the troubleshooting procedure defined as the result of the analysis to the user by operating the trouble information management system 1. Thereat, the user reads the e-mail by operating the terminal device 3, then judges whether the trouble is actually troubleshot or not, and transmits a result of the judgement by e-mail to the trouble information management system 1.

In next step S209, the trouble information management system 1 diverts the processing in accordance with a content of the e-mail delivered from the user in S209. Namely, the operator reads the e-mail by operating the trouble information management system 1, then does inputting for advancing the processing to S211 if the trouble is troubleshot, and does inputting for diverting the processing to S210 if not troubleshot.

In S210, the trouble information management system 1 transmits to the terminal device 3 of the user e-mail for requesting the user to provide more information. Namely, the operator transmits by e-mail inquiry items conceived necessary for troubleshooting the trouble to the terminal device 3 of the user by operating the trouble information management system 1. Thereat, the user receives the e-mail by operating the terminal device 3 and transmits answers thereto by e-mail to the trouble information management system 1. Then, the operator, based on these answers, makes the processing in S207 onwards again proceed by operating the trouble information management system 1.

In S211, the trouble information management system 1 registers a new record of the case data T (FIG. 5). To be specific, the trouble information management system 1 generates the case data T given a new case number (T1), and stores its user ID field T2 with a user ID mapped to the user notifying of a trouble. Further, the trouble information management system 1 stores the ware-category field T3, the trouble component field T4, the name of trouble case field T5, the trouble content field T6, the using OS field T7 and the using PC field T8 in the case data T with the information inputted by the user in S001 in FIG. 6 into the respective input boxes on the input Web page shown in FIG. 7.

Note that the operator extracts only the names of the components classified as those related to the trouble as a result of the analysis in S208 among the components names inputted by the user in S001 in FIG. 6 into the input boxes "using component" on the input Web page shown in FIG. 7. Then, the operator stores only the extracted component names in the related component field T13 in the case data T by operating the trouble information management system 1.

Further, the trouble information management system 1 stores the trouble cause and the troubleshooting procedure as the result of the analysis in S208 in the cause field T9 and the troubleshooting procedure field T10 in the case data T. Note that an initial value "1" is stored in each of the hit count field T11 and in the troubleshooting count field T12 in the case data T.

In next step S212, the trouble information management system 1 notifies the maker-sided device 2 by e-mail that the trouble is troubleshot. Moreover, the trouble information management system 1 obtains one or a plurality of records of the maker data M having the provided-component fields M3 containing the respective component names stored in the related component fields T13 in the case data T newly registered in S211. Then, the trouble information management system 1 delivers e-mail requesting the maker-sided device 2 of the maker mapped to the obtained maker data to calculate a consideration (money gained) for providing the information. In response to this, the person in charge at the maker of whom the fee calculation is demanded, calculates the fee and delivers e-mail indicating the consideration (consideration data) to the trouble information management system 1 by operating the maker-sided device 2.

In next step S213, the trouble information management system 1 receives e-mail indicating the fees that have been delivered from the maker-sided devices 2, and determines, as an information providing fee, an amount of money gained by subtracting a predetermined commission from a total sum of all the considerations. Then, the trouble information management system 1 notifies by e-mail the user terminal device 3 of the thus determined information providing fee. Moreover, the trouble information management system 1 updates an amount of charged money by subtracting the information providing fee from the charged money stored in the charged-money field U5 in the user data U (FIG. 3) mapped to this user. If the charged money is less than the information providing fee, however, a difference between the information providing fee and the charged money is remitted to the user by a bank payment etc. Thereafter, the trouble information management system 1 finishes the process.

Research for New Components

The trouble information management system 1 is capable of asking the users to research for new commercial components that are being developed by the makers. The research for the new components will hereinafter be explained. To start with, the trouble information management system 1 generates the HTML data W showing a purport of recruiting the users wishing to research for the new components. Then, the users are able to browse a Web page corresponding to the same HTML data W by operating the terminal device 3. Applicants among the users browsing this Web page, deliver e-mail indicating their desire for researching to the trouble information management system 1. Thereat, the trouble information management system 1 obtains the components concerned from the maker-sided devices 2 and sends them to the users.

The users receive and examine the components and, if any troubles occur, notify the trouble information management system 1 of the occurrences of the troubles. Hereinafter, the same processes as those discussed above are executed based on the flowchart in FIG. 6.

Maker-Oriented Data

The trouble information management system 1 generates maker-oriented data provided to the respective makers on the basis of the case data T accumulated, and vends the maker-oriented data to the makers. The discussion will hereinafter be focused on how the maker-oriented data are generated.

To begin with, the trouble information management system 1 extracts, for every maker, the case data T (FIG. 5) in which the component provided by this maker is the related component (T13). Namely, the trouble information management system 1 obtains, for every maker, the component names stored in the provided-component fields M3 in the maker data M mapped to the maker concerned, and extracts the case data T in which the obtained component names are stored in the related component fields T13.

Then, the trouble information management system 1 itemizes the case data T extracted for every maker according to the trouble name (T5), the trouble content (T6) and the related component (T13), thus generating a record of maker-oriented data corresponding to each maker. Then, the provider vends the thus generated maker-oriented data to the corresponding maker. Note that the generated maker-oriented data may be transmitted to the maker-sided device 2 of each maker from the trouble information management system 1 and may also be transferred in a state of being stored in an MO (Magneto Optical disk) and so on.

Operation in Embodiment

Owing to the trouble information management system 1 having the architecture described above, the user, if trouble occurs, is able to troubleshoot the trouble by utilizing this trouble information management system 1. Therefore, the user can quickly easily troubleshoot the trouble without inquiring individually of each maker. Moreover, the user, if the trouble case which the provider is informed of is a new case, is allowed to receive the information providing fee. Note that the provider can obtain a difference, as a commission, between the consideration received from the maker with respect to this new case and the information providing fee paid to the user.

Then, the use has a possibility of obtaining the information providing fee and therefore positively provides the trouble information to the provider. The information provided is managed as the case data T in a state of being concentrated at one location without being scattered and lost. The majority of the troubles of which the users inform can be quickly troubleshot based on the case data T. Further, the maker may purchase from the provider the maker-oriented data generated based on the case data T. The maker can enhance a quality of the component thanks to the maker-oriented data. Note that the provider can obtain a profit from vending the maker-oriented data.

Owing to the trouble information management system having the architecture described above according to the present invention, the user, if the trouble occurs, is able to quickly easily troubleshoot the trouble simply by communicating with this trouble information management system without inquiring individually of the maker of each component used.

What is claimed is:

1. A program product comprising a trouble management program recorded on a computer readable medium, said trouble management program controlling a server computer, connected to maker-sided devices of makers providing software or hardware components configuring a computer system and connectable to terminal devices of users utilizing said components, to execute:

a first storing step of storing case data containing a description of a trouble and a troubleshooting procedure;

a step of accepting, when said server computer receives from said terminal device a notification that the trouble occurs, trouble data containing a description of the trouble from said terminal device;

a step of searching for the case data in which the description of this trouble is coincident with the description of trouble in the trouble data;

a first transmitting step of transmitting, if the case data is specified in said searching step, the troubleshooting procedure in the specified case data to said terminal device;

a second transmitting step of transmitting, if the case data is not specified in said searching step, new notification data containing the description of the trouble and indicating that the trouble occurred afresh to said maker-sided device, said new notification data being transmitted according to data related to a maker;

a step of obtaining answer data containing a troubleshooting procedure corresponding to the new notification data from said maker-sided device;

a second storing step of storing the troubleshooting procedure contained in the answer data obtained in said obtaining step and the description about the corresponding trouble as new case data; and a third transmitting step of transmitting the troubleshooting procedure in the case data stored in said second storing step to said terminal device.

2. The program product according to claim 1, wherein the trouble data contains using component information indicating a component used by the user when the trouble occurs;

the case data contains related component information indicating a component related to the trouble;

said trouble management program controls said server computer to further execute a third storing step of storing maker data uniquely related to the maker and containing provided-component information indicating the component provided by the maker;

said second transmitting step transmits the new notification data containing using component information in the trouble data to only said maker-sided device of the maker related to the maker data containing the provided-component information corresponding to the component indicated by the using component information in the trouble data;

said obtaining step obtains the answer data from said maker-sided device to which the new notification data has been transmitted in said second transmitting step;

said second storing step stores the new case data including the related component information which indicates only the component related to the trouble, the relation to the trouble being analyzed based on the answer data obtained in said obtaining step.

3. The program product according to claim 2, wherein said trouble management program controlling said server computer to further execute:

a step of specifying the maker data which contains the provided-component information corresponding to the related component information in the new case data;

a step of acquiring consideration data showing a consideration for the new notification data from said maker-sided device of the maker related to the maker data specified in said specifying step; and a step of calculating an information providing fee paid to the user on the basis of the consideration data acquired in said acquiring step.

4. The program product according to claim 2, wherein said trouble management program controlling said server computer to further execute:

a step of extracting the case data containing the related component information corresponding to the provided-component information in the maker data with respect to each maker; and a step of generating maker-oriented data for each maker on the basis of the extracted case data.

5. A trouble information management method actualized by a server computer connected to maker-sided devices of makers providing software or hardware components configuring a computer system and connectable to terminal devices of users utilizing said components, comprising:

a first storing step of storing case data containing a description of a trouble and a troubleshooting procedure;

a step of accepting, when said server computer receives from said terminal device a notification that the trouble occurs, trouble data containing a description of the trouble from said terminal device;

a step of searching for the case data in which the description of this trouble is coincident with the description of trouble in the trouble data;

a first transmitting step of transmitting, if the case data is specified in said searching step, the troubleshooting procedure in the specified case data to said terminal device;

a second transmitting step of transmitting, if the case data is not specified in said searching step, new notification data containing the description of the trouble and indicating that the trouble occurred afresh to said maker-sided device, said new notification data being transmitted according to data related to a maker;

a step of obtaining answer data containing a troubleshooting procedure corresponding to the new notification data from said maker-sided device;

a second storing step of storing the troubleshooting procedure contained in the answer data obtained in said obtaining step and the description about the corresponding trouble as new case data; and a third transmitting step of transmitting the troubleshooting procedure in the case data stored in said second storing step to said terminal device.

6. The method according to claim 5, wherein the trouble data contains using component information indicating a component used by the user when the trouble occurs;

the case data contains related component information indicating a component related to the trouble;

further comprising a third storing step of storing maker data uniquely related to the maker and containing provided-component information indicating the component provided by the maker said second transmitting step transmits the new notification data containing using component information in the trouble data to only said maker-sided device of the maker related to the maker data containing the provided-component information corresponding to the component indicated by the using component information in the trouble data;

said obtaining step obtains the answer data from said maker-sided device to which the new notification data has been transmitted in said second transmitting step;

said second storing step stores the new case data including the related component information which indicates only the component related to the trouble, the relation to the trouble being analyzed based on the answer data obtained in said obtaining step.

7. The method according to claim 6, further comprising:

a step of specifying the maker data which contains the provided-component information corresponding to the related component information in the new case data;

a step of acquiring consideration data showing a consideration for the new notification data from said maker-sided device of the maker related to the maker data specified in said specifying step; and a step of calculating an information providing fee paid to the user on the basis of the consideration data acquired in said acquiring step.

8. The method according to claim 6, further comprising:

a step of extracting the case data containing the related component information corresponding to the provided-component information in the maker data with respect to each maker; and a step of generating maker-oriented data for each maker on the basis of the extracted case data.

9. A trouble information management system, comprising:

a server computer connected to maker-sided devices of makers providing software or hardware components configuring a computer system and connectable to terminal devices of users utilizing said components; and a computer readable medium containing a trouble information management program which controls said server computer to execute:

a first storing step of storing case data containing a description of a trouble and a troubleshooting procedure;

a step of accepting, when said server computer receives from said terminal device a notification that the trouble occurs, trouble data containing a description of the trouble from said terminal device, a step of searching for the case data in which the description of this trouble is coincident with the description of trouble in the trouble data, a first transmitting step of transmitting, if the case data is specified in said searching step, the troubleshooting procedure in the specified case data to said terminal device, a second transmitting step of transmitting, if the case data is not specified in said searching step, new notification data containing the description of the trouble and indicating that the trouble occurred afresh to said maker-sided device, said new notification data being transmitted according to data related to a maker a step of obtaining answer data containing a troubleshooting procedure corresponding to the new notification data from said maker-sided device, a second storing step of storing the troubleshooting procedure contained in the answer data obtained in said obtaining step and the description about the corresponding trouble as new case data, and a third transmitting step of transmitting the troubleshooting procedure in the case data stored in said second storing step to said terminal device.

10. The system according to claim 9, wherein the trouble data contains using component information indicating a component used by the user when the trouble occurs;

the case data contains related component information indicating a component related to the trouble;

said trouble management program controls said server computer to further execute a third storing step of storing maker data uniquely related to the maker and containing provided-component information indicating the component provided by the maker;

said second transmitting step transmits the new notification data containing using component information in the trouble data to only said maker-sided device of the maker related to the maker data containing the provided-component information corresponding to the component indicated by the using component information in the trouble data;

said obtaining step obtains the answer data from said maker-sided device to which the new notification data has been transmitted in said second transmitting step;

said second storing step stores the new case data including the related component information which indicates only the component related to the trouble, the relation to the trouble being analyzed based on the answer data obtained in said obtaining step.

11. The system according to claim 10, wherein said trouble management program controlling said server computer to further execute:

a step of specifying the maker data which contains the provided-component information corresponding to the related component information in the new case data;

a step of acquiring consideration data showing a consideration for the new notification data from said maker-sided device of the maker related to the maker data specified in said specifying step; and a step of calculating an information providing fee paid to the user on the basis of the consideration data acquired in said acquiring step.

12. The system according to claim 10, wherein said trouble management program controlling said server computer to further execute:

a step of extracting the case data containing the related component information corresponding to the provided-component information in the maker data with respect to each maker; and a step of generating maker-oriented data for each maker on the basis of the extracted case data.

* * * * *

UNITED STATES PATENT AND TRADEMARK OFFICE
CERTIFICATE OF CORRECTION

PATENT NO. : 7,275,080 B2  Page 1 of 1
APPLICATION NO. : 10/058421
DATED : September 25, 2007
INVENTOR(S) : Mineo Arai It is certified that error appears in the above-identified patent and that said Letters Patent is hereby corrected as shown below:

Column 14, Line 67, Claim 6, after "maker" insert --;--.

Column 16, Line 2, Claim 9, after "maker" insert --;--.

Signed and Sealed this

Twenty-ninth Day of April, 2008

JON W. DUDAS
*Director of the United States Patent and Trademark Office*